United States Patent
Fukumoto et al.

(10) Patent No.: US 9,120,941 B2
(45) Date of Patent: Sep. 1, 2015

(54) ULTRAVIOLET-CURABLE INK COMPOSITION FOR INK JET AND INK JET RECORDING METHOD

(71) Applicant: Seiko Epson Corporation, Tokyo (JP)

(72) Inventors: Hiroshi Fukumoto, Shiojiri (JP); Yusuke Mizutaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/299,704

(22) Filed: Jun. 9, 2014

(65) Prior Publication Data

US 2014/0362152 A1 Dec. 11, 2014

(30) Foreign Application Priority Data

Jun. 7, 2013 (JP) ................... 2013-120505

(51) Int. Cl.
*B41J 2/01* (2006.01)
*C09D 11/107* (2014.01)
*C09D 11/324* (2014.01)
*C09D 11/322* (2014.01)
*C09D 11/101* (2014.01)
C09D 11/40 (2014.01)
C09D 11/30 (2014.01)
B41M 7/00 (2006.01)

(52) U.S. Cl.
CPC ............ *C09D 11/107* (2013.01); *C09D 11/101* (2013.01); *C09D 11/322* (2013.01); *C09D 11/324* (2013.01); *B41M 7/0081* (2013.01); C09D 11/30 (2013.01); C09D 11/40 (2013.01)

(58) Field of Classification Search
CPC ........ B41J 11/002; B41J 11/0015; B41J 2/01; C09D 11/101; C09D 11/40; C09D 11/30; B41M 7/0081
See application file for complete search history.

(56) References Cited

U.S. PATENT DOCUMENTS

| 2009/0289999 | A1 | 11/2009 | Takahashi et al. |
| 2012/0147095 | A1* | 6/2012 | Miura et al. ............... 347/47 |
| 2013/0063535 | A1 | 3/2013 | Yoda et al. |
| 2014/0104855 | A1* | 4/2014 | Hutton .................. 362/343 |
| 2014/0258018 | A1* | 9/2014 | Craine .................. 705/26.4 |

FOREIGN PATENT DOCUMENTS

| JP | 2009-279830 A | 12/2009 |
| JP | 2010-209198 A | 9/2010 |
| JP | 2010-269471 A | 12/2010 |
| JP | 2012-140583 A | 7/2012 |
| JP | 2012-188612 A | 10/2012 |
| JP | 2013-060484 A | 4/2013 |
| JP | 2013-071975 A | 4/2013 |

* cited by examiner

*Primary Examiner* — Lisa M Solomon
(74) *Attorney, Agent, or Firm* — Nutter McClennen & Fish LLP; John J. Penny, Jr.

(57) ABSTRACT

An ultraviolet-curable ink composition for ink jet is for use in an ink jet recording method that includes irradiating the ultraviolet-curable ink composition for ink jet applied to a substrate with ultraviolet radiation that has a peak wavelength in the range of 380 to 405 nm from a semiconductor light source to obtain a cured coating. The product of the light transmissivity (%) of the cured coating at a wavelength of 395 nm and the irradiation energy of the ultraviolet radiation (mJ/cm$^2$) is 2.0 or more. The ink composition contains a thioxanthone-based photopolymerization initiator and at least one of yellow coloring material and black coloring material. The OD of the cured coating made from the ink composition is 1.8 or more.

20 Claims, 2 Drawing Sheets ically, an ink jet printer that uses a low-cost semiconductor light source, such as an LED, to cure an ink composition, will be in demand.

ULTRAVIOLET-CURABLE INK COMPOSITION FOR INK JET AND INK JET RECORDING METHOD

BACKGROUND

1. Technical Field

The present invention relates to an ultraviolet-curable ink composition for ink jet and an ink jet recording method.

2. Related Art

Ink jet recording methods, which allow the user to record high-definition images with relatively simple equipment, have been rapidly advancing in various fields. For example, JP-A-2012-188612 discloses an ultraviolet-curable ink composition for ink jet to provide an ultraviolet-curable ink composition for ink jet that has excellent curability and provides excellent abrasion resistance and stretchability to coatings cured therefrom. This ink composition contains a monofunctional (meth)acrylate monomer and a photopolymerization initiator. The molecular structure and the content of the monofunctional (meth)acrylate monomer and the Tg of the cured form of the monofunctional (meth)acrylate averaged by the number of moles are specified.

Furthermore, JP-A-2012-140583 discloses an ultraviolet-curable ink composition for ink jet to provide an ultraviolet-curable ink composition for ink jet that has excellent curability and prevents coatings cured therefrom from being colored soon after ink jet recording. This ink composition contains a selected monomer and a photopolymerization initiator that contains an acylphosphine-oxide-based photopolymerization initiator and a thioxanthone-based polymerization initiator. The total content of the acylphosphine-oxide-based photopolymerization initiator and the thioxanthone-based photopolymerization initiator is from 8% to 16% by mass based on the total mass of the ink composition.

This indicates that it has hitherto been believed that the use of a thioxanthone-based photopolymerization initiator, which is unlikely to be affected by oxygen inhibition, is an effective way to ensure the curability of an ink composition applied to a substrate. Research by the inventors, however, found that when a thioxanthone-based photopolymerization initiator is used, the curability of the ink composition is admittedly good near the surface of the ink composition but is not necessarily good in the ink composition.

More specifically, research by the inventors found that the use of a thioxanthone-based photopolymerization initiator, which exhibits a high percentage of light absorption at wavelengths around 395 nm, causes the ink composition to be lacking in curability inside, particularly in light curing with a semiconductor light source, such as an LED, as a result of inhibited transmission of light into the ink composition applied to a substrate. The research also revealed that this reduced internal curability leads to poor adhesion of the ink composition to the substrate. An ink composition that contains such a thioxanthone-based photopolymerization initiator and yellow coloring material and/or black coloring material, which both exhibit a low percentage of light absorption at wavelengths around 395 nm, in such a manner that coatings cured from the ink composition will have a predetermined OD (optical density) is less adhesive because of more severely inhibited inward transmission of light. An ultraviolet-curable ink composition for ink jet that contains yellow coloring material and/or black coloring material and exhibits excellent adhesiveness even when ultraviolet radiation with a peak wavelength in the range of 380 to 405 nm is used would become increasingly useful because UV ink jet printers,

SUMMARY

An advantage of an aspect of the invention is that an ultraviolet-curable ink composition for ink jet is provided that contains yellow coloring material and/or black coloring material and exhibits excellent adhesiveness when ultraviolet radiation with a peak wavelength in the range of 380 to 405 nm is used. An advantage of another aspect of the invention is that an ink jet recording method is provided in which such an ink composition is used.

The inventors conducted extensive research to solve the above problems. As a result, the inventors found that an ink composition that has a particular composition solves the above problems when used in combination with ultraviolet radiation with a peak wavelength in the range of 380 to 405 nm, and completed the invention.

More specifically, some aspects of the invention are as follows.

1. An ultraviolet-curable ink composition for ink jet is for use in an ink jet recording method that includes irradiating the ultraviolet-curable ink composition for ink jet applied to a substrate with ultraviolet radiation with a peak wavelength in the range of 380 to 405 nm from a semiconductor light source to obtain a cured coating. The product of the light transmissivity (%) of the cured coating at a wavelength of 395 nm and the irradiation energy of the ultraviolet radiation ($mJ/cm^2$) is 2.0 or more. The ink composition contains a thioxanthone-based photopolymerization initiator and at least one of yellow coloring material and black coloring material. The OD of the cured coating made from the ink composition is 1.8 or more.

2. For the ultraviolet-curable ink composition for ink jet according to 1, the ink jet recording method may be one in which recording is carried out by one-pass printing with a line printer that has a line head that has a width equal to or greater than the recording width of the substrate.

3. For the ultraviolet-curable ink composition for ink jet according to 1 or 2, the irradiation energy of the ultraviolet radiation may be from 350 to 1000 $mJ/cm^2$.

4. For the ultraviolet-curable ink composition for ink jet according to any one of 1 to 3, the substrate may be a non-ink-absorbent substrate.

5. The ultraviolet-curable ink composition for ink jet according to any one of 1 to 4 may contain 2.0% to 5.0% by mass the thioxanthone-based photopolymerization initiator.

6. The ultraviolet-curable ink composition for ink jet according to any one of 1 to 5 may further contain 0.30% by mass or more silicone surfactant.

7. The ultraviolet-curable ink composition for ink jet according to any one of 1 to 6 may further contain 5.0% to 15% by mass acylphosphine-oxide-based photopolymerization initiator.

8. For the ultraviolet-curable ink composition for ink jet according to any one of 1 to 7, the ink jet recording method may be one in which recording is carried out with a recording resolution of 600 dpi or more×600 dpi or more.

9. The ultraviolet-curable ink composition for ink jet according to any one of 1 to 8 may contain 2.5% to 2.9% by mass the yellow coloring material or 1.5% to 1.9% by mass the black coloring material.

10. For the ultraviolet-curable ink composition for ink jet according to any one of 1 to 9, the ink jet recording method may be one in which irradiation with the ultraviolet radiation is carried out more than once.

11. For the ultraviolet-curable ink composition for ink jet according to any one of 1 to 10, the thickness of the cured coating may be 13 μm or less.

12. For the ultraviolet-curable ink composition for ink jet according to any one of 1 to 11, the cured coating has a light transmissivity of 0.0030% or more at a wavelength of 395 nm when having a thickness of 10 μm.

13. An ink jet recording method includes discharging and applying the ultraviolet-curable ink composition for ink jet according to any one of 1 to 12 to a substrate and irradiating the ultraviolet-curable ink composition for ink jet applied to the substrate with ultraviolet radiation from a semiconductor light source with a peak wavelength in the range of 380 to 405 nm to obtain a cured coating that has an OD of 1.8 or more. The product of the light transmissivity (%) of the cured coating made from the ultraviolet-curable ink composition for ink jet at a wavelength of 395 nm and the irradiation energy of the ultraviolet radiation (mJ/cm$^2$) is 2 or more.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
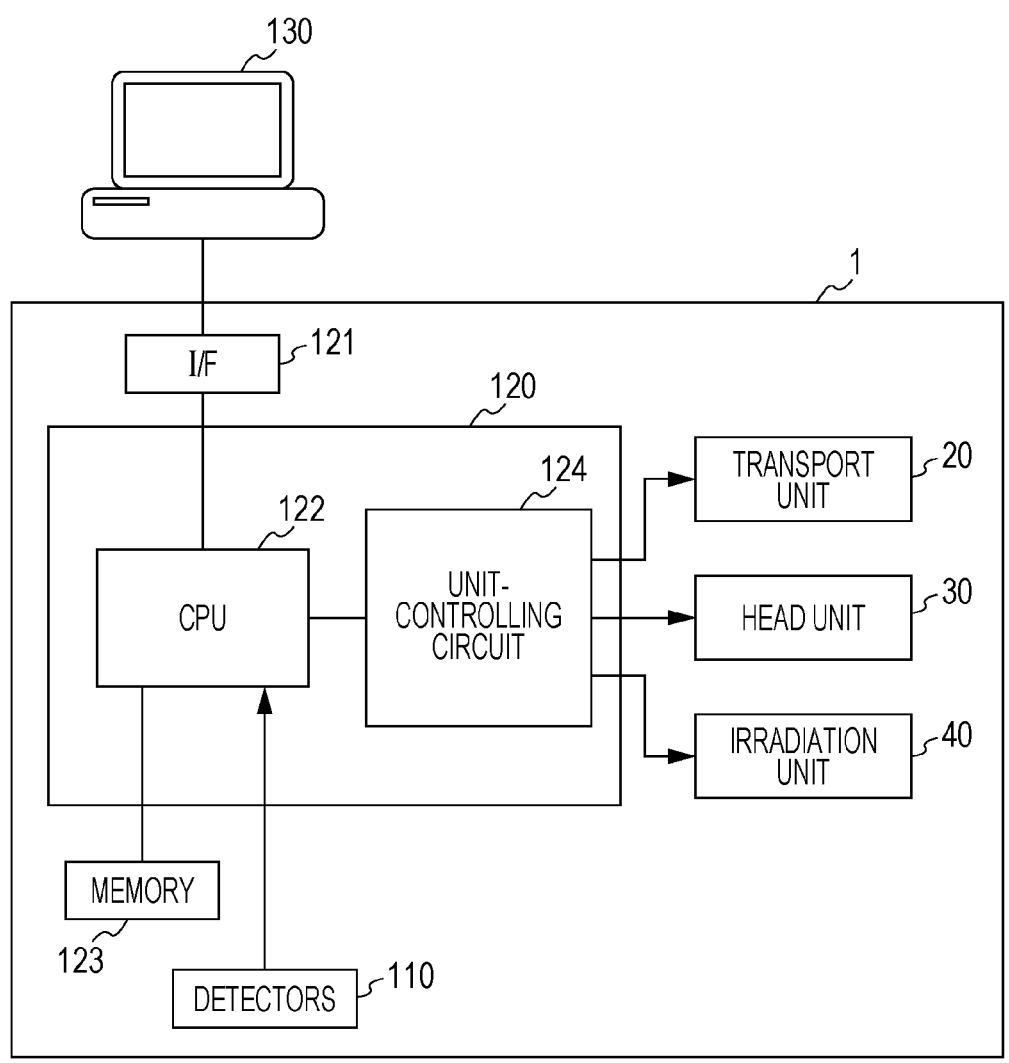
FIG. 1 is a block diagram that illustrates an example of the structure of an ink jet recording apparatus that can be used in this embodiment.

The following describes an embodiment of the invention (hereinafter referred to as "this embodiment") in detail while referring to the drawings as necessary. No aspect of the invention is limited to this embodiment, and various modifications can be made without departing from the scope of that aspect of the invention. Like numbers in the drawings reference like elements, and duplicate descriptions are omitted. The positional relationships such as above, below, left, and right are based on the positional relationships illustrated in the drawings unless otherwise specified. The ratios between dimensions in the drawings are not limited to the illustrated ratios.

Ultraviolet-Curable Ink Composition for Ink Jet

An ultraviolet-curable ink composition for ink jet (hereinafter also simply referred to as "the ink composition") according to this embodiment is for use in an ink jet recording method that includes irradiating the ultraviolet-curable ink composition for ink jet applied to a substrate with ultraviolet radiation with a peak wavelength in the range of 380 to 405 nm from a semiconductor light source to obtain a cured coating. The product of the light transmissivity (%) of the cured coating at a wavelength of 395 nm and the irradiation energy of the ultraviolet radiation (mJ/cm$^2$) is 2.0 or more. The ink composition contains a thioxanthone-based photopolymerization initiator and at least one of yellow coloring material and black coloring material. The OD of the cured coating made from the ink composition is 1.8 or more.

In general, adding a thioxanthone-based photopolymerization initiator reduces surface tackiness and, particularly when forming a thin film, which is susceptible to oxygen inhibition, prevents the mixing of colors between dots and bleeding by allowing the surface of the ink composition to cure. However, it was found that a thioxanthone-based photopolymerization initiator tends to inhibit the internal curability of the ink composition (reduce the light transmissivity of the coating) and affect adhesiveness (in particular, adhesiveness of thick films). The reduction of adhesiveness is particularly significant when the ink composition is irradiated with ultraviolet radiation with a peak wavelength in the range of 380 to 405 nm from an LED to form a cured coating that has an OD of 1.8 or more.

Research for an ink composition that contains a thioxanthone-based photopolymerization initiator and has excellent adhesiveness revealed that the use of an ink composition with a particular semiconductor light source in an ink jet recording method in which the product of irradiation energy and the transmissivity of the cured coating of the ink composition is 2 or more ensures that ultraviolet radiation penetrates deep into the ink composition and, as a result, adhesiveness is ensured.

The shorter the wavelength is, the deeper the light penetrates into the ink composition. An ink composition therefore tends to exhibit good internal curability and excellent adhesiveness when used with a metal halide light source or a mercury lamp, which both have emission wavelengths reaching the short wavelength range. However, these ultraviolet light sources are disadvantageous because of their great heat production, short operation life, high power consumption, and large size. Thus an ink composition according to this embodiment is for use in an ink jet recording method in which a semiconductor light source, which is excellent in terms of the above characteristics, is used.

Thioxanthone-Based Photopolymerization Initiator

An ink composition according to this embodiment contains a thioxanthone-based photopolymerization initiator. The thioxanthone-based photopolymerization initiator reduces surface tackiness and, particularly when forming a thin film, which is susceptible to oxygen inhibition, prevents the mixing of colors between dots and bleeding by allowing the surface of the ink composition to cure.

Specifically, the ink composition preferably contains one or more selected from the group consisting of thioxanthone, diethylthioxanthone, isopropylthioxanthone, and chlorothioxanthone, although preferred thioxanthone-based photopolymerization initiators are not limited to these. Examples of preferred diethylthioxanthones include 2,4-diethylthioxanthone, examples of preferred isopropylthioxanthones include 2-isopropylthioxanthone, and examples of preferred chlorothioxanthones include 2-chlorothioxanthone, although not limited to these. Such an ink composition containing a thioxanthone-based photopolymerization initiator tends to have excellent curability, storage stability, and discharge stability. A thioxanthone-based photopolymerization initiator that contains diethylthioxanthone is particularly preferred. Diethylthioxanthone tends to make it more efficient to convert a wide range of ultraviolet light (UV light) into a radical species.

Specific examples of commercially available thioxanthone-based photopolymerization initiators include, but are not limited to, Speedcure DETX (2,4-diethylthioxanthone) and Speedcure ITX (2-isopropylthioxanthone) (Lambson) and KAYACURE DETX-S (2,4-diethylthioxanthone) (Nippon Kayaku Co., Ltd.).

The thioxanthone-based photopolymerization initiator content is preferably from 2.0% to 5.0% by mass, more preferably from 2.5% to 4.5% by mass, even more preferably from 3% to 4% by mass, based on the total mass (100% by mass) of the ink composition. Ensuring that the thioxanthone-based photopolymerization initiator content is 2.0% by mass or more often makes the initiator more effective in reducing surface tackiness and, when forming a thin film, which is susceptible to oxygen inhibition, more effective in preventing the mixing of colors between dots and bleeding by allowing the surface of the ink composition to cure. Ensuring that the thioxanthone-based photopolymerization initiator content is 5.0% by mass or less often limits the coloring of the ink composition with the initiator itself, limits yellowed hue, and provides the cured coating with excellent adhesiveness.

Other Photopolymerization Initiators

The ink composition may further contain other photopolymerization initiators. Such additional photopolymerization initiators can be of any kind that uses energy of light (ultraviolet radiation) to produce an active species, such as a radical or a cation, and thereby initiates the polymerization of a polymerizable compound, such as radical-photopolymerization initiators and cation-photopolymerization initiators. In particular, a radical-photopolymerization initiator is preferred.

Examples of radical-photopolymerization initiators include, but are not limited to, aromatic ketones, acylphosphine oxide compounds, aromatic onium salt compounds, organic peroxides, thio compounds (e.g., compounds that contain a thiophenyl group), α-aminoalkylphenone compounds, hexaarylbiimidazoles compounds, ketoxime ester compounds, borate compounds, azinium compounds, metallocene compounds, active ester compounds, compounds that have a carbon-halogen bond, and alkylamine compounds.

It is particularly preferred that an acylphosphine-oxide-based photopolymerization initiator (an acylphosphine oxide compound) be additionally contained. An acylphosphine-oxide-based photopolymerization initiator is susceptible to oxygen inhibition, but on the other hand is suitable for curing with an LED that emits long-wavelength light. Using an acylphosphine-oxide-based photopolymerization initiator and a thioxanthone-based photopolymerization initiator in combination therefore often makes the ink composition more suitable for curing processes in which an UV-LED is used and enhances the curability and the adhesiveness of the ink composition.

Specific examples of acylphosphine-oxide-based photopolymerization initiators include, but are not limited to, bis(2, 4,6-trimethylbenzoyl)-phenylphosphine oxide, 2,4,6-trimethylbenzoyl diphenylphosphine oxide, and bis(2,6-dimethoxybenzoyl)-2,4,4-trimethylpentylphosphine oxide.

Examples of commercially available acylphosphine-oxide-based photopolymerization initiators include, but are not limited to, IRGACURE 819 (bis(2,4,6-trimethylbenzoyl)-phenylphosphine oxide) and DAROCUR TPO (2,4,6-trimethylbenzoyl diphenylphosphine oxide).

The content of such an acylphosphine-oxide-based photopolymerization initiator is preferably from 5.0% to 15% by mass, more preferably from 6.0% to 10.0% by mass, even more preferably from 7.0% to 8.0% by mass, based on the total mass (100% by mass) of the ink composition. Ensuring that the acylphosphine-oxide-based photopolymerization initiator content is 5.0% by mass or more often enhances curability. Making the acylphosphine-oxide-based photopolymerization initiator content 15% by mass or less often ensures good dissolution of solids and good storage stability and enhances reliability.

Examples of other radical-photopolymerization initiators include, but are not limited to, acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methyl propan-1-one, 2-hydroxy-2-methyl-1-phenylpropan-1-one, and 2-methyl-1-[4-(methylthio)phenyl]-2-morpholinopropan-1-one Examples of commercially available radical-photopolymerization initiators include, but are not limited to, IRGACURE 651 (2,2-dimethoxy-1,2-diphenylethan-1-one), IRGACURE 184 (1-hydroxycyclohexyl phenyl ketone), DAROCUR 1173 (2-hydroxy-2-methyl-1-phenylpropan-1-one), IRGACURE 2959 (1-[4-(2-hydroxyethoxy)phenyl]-2-hydroxy-2-methyl-1-propan-1-one), IRGACURE 127 (2-hydroxy-1-{4-[4-(2-hydroxy-2-methylpropionyl)benzyl]phenyl}-2-methylpropan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-1-butanone-1), IRGACURE 379 (2-(dimethylamino)-2-[(4-methylphenyl)methyl]-1-[4-(4-morpholinyl)phenyl]-1-butanone), IRGACURE 784 (bis(η5-2,4-cyclopentadien-1-yl)-bis(2,6-difluoro-3-(1H-pyrrol-1-yl)-phenyl)titanium), IRGACURE OXE 01 (1.2-octandione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (a mixture of 2-[2-oxo-2-phenylacetoxyethoxy]ethyl oxyphenylacetate and 2-(2-hydroxyethoxy)ethyl oxyphenylacetate) (BASF), Speedcure TPO (Lambson), Lucirin TPO, LR8893, and LR8970 (BASF), and Ubecryl P36 (UCB).

Specific examples of cation-photopolymerization initiators include, but are not limited to, sulfonium salts and iodonium salts.

Specific examples of commercially available cation-photopolymerization initiators include, but are not limited to, Irgacure 250 and Irgacure 270.

One or a combination of two or more such photopolymerization initiators can be used.

The content of such an additional photopolymerization initiator is preferably from 5% to 20% by mass based on the total mass (100% by mass) of the ink composition. Ensuring that the additional photopolymerization initiator content is in this range often allows the ink composition to cure sufficiently fast upon exposure to ultraviolet radiation and prevents the photopolymerization initiator from remaining undissolved or coloring the ink composition.

Coloring Material

The ink composition contains at least one of yellow coloring material and black coloring material and may optionally contain other coloring materials. The coloring material can be either or both of pigment and dye. A cured coating that contains yellow coloring material or black coloring material tends to have low adhesiveness because low transmissivity inhibits ultraviolet light from reaching the inside of the ink composition. Admittedly it is possible to increase the transmissivity of such a cured coating by reducing the yellow coloring material or black coloring material content, but this always results in a cured coating with a low OD and a weak color. An ink composition according to this embodiment, which is for use in an ink jet recording method in which the ink composition is irradiated with ultraviolet radiation in such a manner that the product of the light transmissivity of the cured coating at a wavelength of 395 nm and the irradiation energy of the ultraviolet radiation should be 2 or more, provides the cured coating with excellent adhesiveness, despite the presence of yellow coloring material or black coloring material.

Pigment

The use of pigment as coloring material improves the light resistance of the ink composition. Such pigment can be an inorganic pigment or an organic pigment.

Examples of inorganic pigments that can be used include carbon blacks (C.I. Pigment Black 7) such as furnace black, lamp black, acetylene black, and channel black, iron oxide, and titanium oxide.

Examples of organic pigments azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (e.g., basic-dye chelates and acid-dye chelates), dye lakes (basic-dye lakes and acid-dye lakes), nitro pigments, nitroso pigments, aniline black, and daylight fluorescent pigments.

Examples of carbon blacks for use as black coloring material include, but are not limited to, No. 2300, No. 900, MCF88, No. 33, No. 40, No. 45, No. 52, MA7, MA8, MA100, No. 2200B, etc. (Mitsubishi Chemical Corporation), Raven 5750, Raven 5250, Raven 5000, Raven 3500, Raven 1255, Raven 700, etc. (Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, etc. (CABOT JAPAN K.K.), Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4 (Degussa).

Examples of pigments for use as yellow coloring material include, but are not limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of pigments for use as white coloring material include, but are not limited to, C.I. Pigment White 6, 18, and 21.

Examples of pigments for use as magenta coloring material include, but are not limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Examples of pigments for use as cyan coloring material include, but are not limited to, C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of pigments for use as coloring materials other than magenta, cyan, and yellow ones include, but are not limited to, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

One or a combination of two or more such pigments can be used.

When pigment is used, the average particle diameter of the pigment is preferably 300 nm or less, more preferably from 50 to 200 nm. When having an average particle diameter in these ranges, the pigment has better reliability in the ink composition, such as discharge stability and dispersion stability, than in other cases and also forms images with excellent quality. The average particle diameter mentioned herein is measured by dynamic light scattering.

Dye

Dye can be used as coloring material. Examples of dyes that can be used include, but are not limited to, acid dyes, direct dyes, reactive dyes, and basic dyes.

Examples of dyes for use as yellow coloring material include, but are not limited to, C.I. Acid Yellow 17, 23, 42, 44, 79, and 142.

Examples of dyes for use as black coloring material include, but are not limited to, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Black 19, 38, 51, 71, 154, 168, 171, and 195, and C.I. Reactive Black 3, 4, and 35.

Examples of dyes for use as other coloring materials include, but are not limited to, C.I. Acid Red 52, 80, 82, 249, 254, and 289, C.I. Acid Blue 9, 45, and 249, C.I. Direct Red 1, 4, 9, 80, 81, 225, and 227, C.I. Direct Blue 1, 2, 15, 71, 86, 87, 98, 165, 199, and 202, and C.I. Reactive Red 14, 32, 55, 79, and 249.

One or a combination of two or more such dyes can be used.

The yellow coloring material content is preferably from 2.5% to 2.9% by mass, more preferably from 2.6% to 2.8% by mass, even more preferably 2.6% to 2.7% by mass, based on the total mass (100% by mass) of the ink composition. Ensuring that the yellow coloring material content is in these ranges often enhances color development without excessively increasing the viscosity of the ink composition.

The black coloring material content is preferably from 1.5% to 1.9% by mass, more preferably from 1.6% to 1.9% by mass, even more preferably 1.8% to 1.9% by mass, based on the total mass (100% by mass) of the ink composition. Ensuring that the black coloring material content is in these ranges often enhances color development without excessively increasing the viscosity of the ink composition.

Surfactant

An ink composition according to this embodiment may further contain a surfactant. Examples of surfactants include, but are not limited to, silicone surfactants (examples of commercially available ones include BYK UV3500 and UV3570 (trade names of BYK Japan products)) and acrylic surfactants (BYK350 (a trade name of a BYK Japan product). In particular, adding a silicone surfactant, which has an excellent potential to reduce surface tension, often improves wetting on a substrate, helps solid filling, and allows for easy adjustment of surface tension.

The content of such a surfactant is preferably 0.20% by mass or more, more preferably 0.30% by mass or more, even more preferably 0.40% by mass or more, in particular, 0.50% by mass or more, and is preferably 1.0% by mass or less, more preferably 0.8% by mass or less, even more preferably 0.7% by mass or less, based on the total mass (100% by mass) of the ink composition. Ensuring that the surfactant content is 0.20% by mass or more often enhances the wetting on a substrate. Making the surfactant content 1.0% by mass or less often ensures good repellence by a nozzle plate of a head and, as a result, enhances discharge stability.

The surface tension of the ink composition is preferably 23 mN/m or less, more preferably 22 mN/m or less. The lower limit of the surface tension is not specified. The lower the surface tension is, the better. Ensuring that the surface tension is in these ranges often enhances the wetting on a substrate. The surface tension can be measured by, for example, the Wilhelmy method with an ordinary surface tensiometer (e.g., CBVP-Z surface tensiometer available from Kyowa Interface Science Co., Ltd.) at a liquid temperature of 25° C.

Examples of preferred silicone surfactants include polysiloxane compounds, such as polyether-modified organosiloxanes. Commercially available silicone surfactants can be used, including BYK-306, BYK-307, BYK-333, BYK-341, BYK-345, BYK-346, and BYK-348 (trade names, BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical Co., Ltd.).

Polymerizable Compound

The ink composition may contain a polymerizable compound. Such a polymerizable compound is polymerized alone or by the action of a photopolymerization initiator upon irradiation with light to cure the ink composition on a substrate. Specific examples of polymerizable compounds include, but are not limited to, known monofunctional, bifunctional, and multifunctional (having three or more functional groups) monomers and oligomers. One or a combination of two or more polymerizable compounds can be used. The following presents examples of these polymerizable compounds.

Examples of monofunctional, bifunctional, and multifunctional (having three of more functional groups) monomers include, but are not limited to, the following: unsaturated carboxylic acids such as (meth)acrylic acid, itaconic acid, crotonic acid, isocrotonic acid, and maleic acid; salts of such unsaturated carboxylic acids; esters, urethanes, amides, and anhydrides derived from such unsaturated carboxylic acids; acrylonitrile, styrene, and various unsaturated polyesters, unsaturated polyethers, unsaturated polyamides, and unsaturated urethanes. Examples of monofunctional, bifunctional, and multifunctional (having three or more functional groups) oligomers include oligomers made up of the monomers listed above, such as linear acrylic oligomers, and epoxy(meth)acrylate, oxetane(meth)acrylate, aliphatic urethane(meth)acrylates, aromatic urethane(meth)acrylates, and polyester (meth)acrylates.

Other monofunctional monomers and multifunctional monomers may include N-vinyl compounds. Examples of N-vinyl compounds include, but are not limited to, N-vinylformamide, N-vinylcarbazole, N-vinylacetamide, N-vinylpyrrolidone, N-vinylcaprolactam, acryloyl morpholine, and their derivatives.

Examples of monofunctional (meth)acrylates include, but are not limited to, isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethylhexyl-diglycol(meth)acrylate, 2-hydroxybutyl(meth)acrylate, butoxyethyl(meth)acrylate, ethoxydiethylene glycol(meth)acrylate, methoxydiethylene glycol(meth)acrylate, methoxypolyethylene glycol(meth)acrylate, methoxypropylene glycol(meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, lactone-modified flexible (meth)acrylate, t-butyl cyclohexyl(meth)acrylate, dicyclopentanyl(meth)acrylate, and dicyclopentenyloxyethyl(meth)acrylate. In particular, phenoxyethyl(meth)acrylate is preferred.

The content of such a monofunctional (meth)acrylate is preferably from 30% to 85% by mass, more preferably from 40% to 75% by mass, based on the total mass (100% by mass) of the ink composition. Ensuring that the monofunctional (meth)acrylate content is in these preferred ranges often enhances curability, initiator dissolution, storage stability, and discharge stability.

Monofunctional (meth)acrylates that contain a vinyl ether group are also included. Examples of monofunctional (meth)acrylates of this type include, but are not limited to, 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxymethylpropyl(meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl(meth)acrylate, p-vinyloxymethylphenylmethyl(meth)acrylate, m-vinyloxymethylphenylmethyl(meth)acrylate, o-vinyloxymethylphenylmethyl(meth)acrylate, 2-(vinyloxyethoxy)ethyl(meth)acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl(meth)acrylate, 2-(isopropenoxyethoxyethoxy)ethyl(meth)acrylate, 2-(isopropenoxyethoxyethoxyethoxy)ethyl(meth)acrylate, 2-(isopropenoxyethoxyethoxyethoxyethoxy)ethyl(meth)acrylate, polyethylene glycol monovinyl ether(meth)acrylate and polypropylene glycol monovinyl ether(meth)acrylate, phenoxyethyl(meth)acrylate, isobornyl(meth)acrylate, and benzyl(meth)acrylate. In particular, 2-(vinyloxyethoxy)ethyl(meth)acrylate, phenoxyethyl(meth)acrylate, isobornyl(meth)acrylate, and benzyl(meth)acrylate are preferred.

In particular, 2-(vinyloxyethoxy)ethyl(meth)acrylate, i.e., at least one of 2-(vinyloxyethoxy)ethyl acrylate and 2-(vinyloxyethoxy)ethyl methacrylate, is preferred because these compounds further reduce the viscosity of the ink, have a high ignition point, and provide the ink composition with excellent curability, and 2-(vinyloxyethoxy)ethyl acrylate is more preferred. Having a simple structure and a small molecular weight, both 2-(vinyloxyethoxy)ethyl acrylate and 2-(vinyloxyethoxy)ethyl methacrylate significantly reduce the viscosity of the ink composition. Examples of 2-(vinyloxyethoxy)ethyl(meth)acrylate include 2-(2-vinyloxyethoxy)ethyl(meth)acrylate and 2-(1-vinyloxyethoxy)ethyl(meth)acrylate, and examples of 2-(vinyloxyethoxy)ethyl acrylate include 2-(2-vinyloxyethoxy)ethyl acrylate and 2-(1-vinyloxyethoxy)ethyl acrylate. In addition, 2-(vinyloxyethoxy)ethyl acrylate is better than 2-(vinyloxyethoxy)ethyl methacrylate in terms of curability.

The content of such a vinyl-ether-containing (meth)acrylate, in particular, 2-(vinyloxyethoxy)ethyl(meth)acrylate, is preferably from 10% to 70% by mass, more preferably from 30% to 50% by mass, based on the total mass (100% by mass)

of the ink composition. Making the vinyl-ether-containing (meth)acrylate content 10% by mass or more often ensures a low viscosity of the ink composition and enhances the curability of the ink composition. Ensuring that the vinyl-ether-containing (meth)acrylate content is 70% by mass or less often enhances the stability of the ink composition and the surface gloss of the printed matter.

Examples of bifunctional (meth)acrylates, within (meth) acrylates, include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, polytetramethylene glycol di(meth) acrylate, diethylene glycol di(meth)acrylate, triethylene glycol di(meth)acrylate, and (meth)acrylates that have a pentaerythritol skeleton or a dipentaerythritol skeleton and three or more functional groups. Dipropylene glycol di(meth) acrylate is preferred, and dipropylene glycol di(meth)acrylate, tripropylene glycol di(meth)acrylate, diethylene glycol di(meth)acrylate, triethylene glycol di(meth)acrylate, and (meth)acrylates that have a pentaerythritol skeleton or a dipentaerythritol skeleton and three or more functional groups are particularly preferred. It is more preferred that the ink composition contain a multifunctional (meth)acrylate in addition to a monofunctional (meth)acrylate.

The content of such a multifunctional (meth)acrylate having two or more functional groups is preferably from 5% to 60% by mass, more preferably from 15% to 60% by mass, even more preferably from 20% to 50% by mass, based on the total mass (100% by mass) of the ink composition. Ensuring that the multifunctional (having two or more functional groups) (meth)acrylate content in these preferred ranges enhances curability, storage stability, and discharge stability as well as the surface gloss of the printed matter.

Examples of multifunctional (meth)acrylates having three or more functional groups, within (meth)acrylates, include trimethylolpropane tri(meth)acrylate, EO-modified trimethylolpropane tri(meth)acrylate, pentaerythritol tri(meth) acrylate, pentaerythritol tetra(meth)acrylate, dipentaerythritol hexa(meth)acrylate, ditrimethylolpropane tetra(meth) acrylate, glycerol propoxy tri(meth)acrylate, caprolactone-modified trimethylolpropane tri(meth)acrylate, pentaerythritol ethoxy tetra(meth)acrylate, and caprolactam-modified dipentaerythritol hexa(meth)acrylate.

Preferably, the ink composition contains a monofunctional (meth)acrylate, in particular, as a polymerizable compound. This provides the ink composition with a low viscosity and allows additives such as the photopolymerization initiator to be highly soluble in the ink composition, as well as ensuring that discharge stability can be easily achieved during ink jet recording. It is more preferred to use a monofunctional (meth) acrylate and a bifunctional (meth)acrylate in combination, even more preferably phenoxyethyl(meth)acrylate and dipropylene glycol di(meth)acrylate in combination, because this improves the toughness, heat resistance, and chemical resistance of the cured coating.

The content of such a polymerizable compound is preferably from 5% to 95% by mass, more preferably 15% to 90% by mass, based on the total mass (100% by mass) of the ink composition. Ensuring that the polymerizable compound content is in these ranges further reduces viscosity and odor and enhances the dissolution and the reactivity of the photopolymerization initiator and the surface gloss of the printed matter.

Dispersant

When containing pigment, the ink composition may further contain a dispersant to make the pigment more dispersible. Examples of dispersants include, but are not limited to, dispersants commonly used to prepare liquid pigment dispersion, such as polymeric dispersants. Specific examples include dispersants mainly composed of one or more of polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resin. Examples of commercially available polymeric dispersants include AJISPER dispersants manufactured by Ajinomoto Fine-Techno, Solsperse dispersants (e.g., Solsperse 36000) available from Avecia and Noveon, DISPERBYK dispersants manufactured by BYK Chemie, and DISPARLON dispersants manufactured by Kusumoto Chemicals.

Other Additives

The ink composition may contain additives (components) other than those described above. Examples of such components may include, but are not limited to, known slipping agents (surfactants), polymerization accelerators, penetration enhancers, moisturizing agents (humectants), and other additives. Examples of the "other additives" include known fixatives, antimolds, preservatives, antioxidants, ultraviolet absorbents, chelators, pH-adjusting agents, and thickeners.

Other Embodiments of Ink Compositions

In addition to the ink composition described above, which contains at least one of yellow coloring material and black coloring material, ink compositions according to this embodiment include those that satisfy the following conditions: the light transmissivity of a 10-μm thick cured coating at a wavelength of 395 nm is from 0.002% to 0.015%; the OD of a 10-μm thick cured coating is 1.8 or more; and the ink composition contains the aforementioned thioxanthone-based photopolymerization initiator and the coloring materials described above (not limited to yellow and black coloring materials). Although such an ink composition may contain a coloring material other than yellow and black ones, the other components and the characteristics of the ink composition can be the same as those of the ink composition described above, which contains at least one of yellow coloring material and black coloring material.

Substrate

Examples of the aforementioned substrate include, but are not limited to, substrates that absorb no ink (non-ink-absorbent) or little ink (low-ink-absorbent). In particular, a non-ink-absorbent substrate is preferred. When a non-ink-absorbent substrate is used, trying to ensure color development very often results in poor adhesion because the color development is in direct correlation with the thickness of a coating. Furthermore, impermeability to ink causes detachment at the interface between the ink and the substrate. The use of a non-ink-absorbent substrate therefore makes a certain aspect of the invention more effective. Ink-absorbent substrates, which are permeable to ink, tend to be free of interfacial detachment, although inferior in internal curability.

Examples of non-ink-absorbent substrates, within the substrates mentioned above, include, but are not limited to, plastic films not surface-treated for ink jet recording (i.e., having no ink-absorbing layer) and paper or a similar kind of substrate coated with a plastic material or covered with adhesive plastic film. Examples of plastic materials for this purpose include polyvinyl chloride (PVC), polyethylene terephthalate (PET), polycarbonate (PC), polystyrene (PS), polyurethane (PU), polyethylene (PE), and polypropylene (PP). Examples of low-ink-absorbent substrates include kinds of printing paper such as art paper, coated paper, and matte paper.

The non-ink-absorbent and low-ink-absorbent substrates are substrates whose recording surface absorbs 10 mL/m$^2$ or less of water in 30 msec from the time of contact in the Bristow method. The Bristow method is the most common method for rapid measurement of the amount of absorption of liquid and is endorsed by Japan Technical Association of the Pulp and Paper Industry (JAPAN TAPPI). The details of the test method can be found in Test No. 51 "Paper and Cardboard—Liquid Absorbency Test Method—the Bristow Method" of "JAPAN TAPPI Pulp and Paper Test Methods 2000."

Ink Jet Recording Method

An ink jet recording method according to this embodiment includes: discharging and applying the above-described ultraviolet-curable ink composition for ink jet to a substrate; and irradiating the ultraviolet-curable ink composition for ink jet applied to the substrate with ultraviolet radiation from a semiconductor light source with a peak wavelength in the range of 380 to 405 nm to obtain a cured coating that has an OD of 1.8 or more. The product of the light transmissivity (%) of the cured coating made from the ultraviolet-curable ink composition for ink jet at a wavelength of 395 nm and the irradiation energy of the ultraviolet radiation (mJ/cm$^2$) is 2 or more.

Discharge

An ink jet recording method according to this embodiment includes discharging and applying an ultraviolet-curable ink composition for ink jet to a substrate. Preferably, the ink composition is discharged in such a manner that the recording resolution of the cured material is 600 dpi or more×600 dpi or more. More preferably, the ink composition is discharged in such a manner that the recording resolution of the cured material is 720 dpi or more×720 dpi or more. Even more preferably, the ink composition is discharged in such a manner that the recording resolution of the cured material is 1200 dpi or more×1200 dpi or more. The upper limit of recording resolution is not limited, and it can be, for example, 5000 dpi or less×5000 dpi or less. In single-pass printing, solid filling requires more ink per dot than in serial printing, particularly when printing the image on a substrate with insufficient wettability, because adjacent applied dots interfere with each other to prevent the dots from spreading. This problem is more serious when the resolution is low. An ink composition according to this embodiment achieves solid filling in an amount of 10 µm or less when the recording resolution is 600×600 dpi or more. Achieving solid filling with a relatively small amount of ink per dot in such a way often leads to reduced feeling of coating thickness on the printed matter and more reasonable ink cost to the user.

Curing

The ultraviolet-curable ink composition for ink jet applied to the substrate is irradiated with ultraviolet radiation with a peak wavelength in the range of 380 to 405 nm from a semiconductor light source to form a cured coating that has an OD of 1.8 or more.

The ink composition applied to the substrate is cured by irradiating the ink composition with ultraviolet radiation (light) from a light source. The photopolymerization initiator in the ink composition decomposes upon irradiation with ultraviolet radiation, forming an initiating species, such as a radical, an acid, or a base, and the initiating species promotes the polymerization reaction of the polymerizable compound. In a different case, irradiation with ultraviolet radiation initiates the polymerization reaction of the polymerizable compound.

The light source (the source of ultraviolet radiation) is a semiconductor light source. Examples include LEDs (light-emitting diodes) such as an ultraviolet-light-emitting diode (UV-LED) and an ultraviolet-laser diode (UV-LD). The use of a semiconductor light source allows the ink jet recording apparatus to be smaller in size and extends the life of the ink jet recording apparatus and makes the ink jet recording method more efficient and less costly, compared to the use of a metal halide light source or a mercury lamp.

The irradiation with ultraviolet radiation is such that the product of the light transmissivity (%) of the cured coating at a wavelength of 395 nm and the irradiation energy (mJ/cm$^2$) of the ultraviolet radiation should be 2 or more. The product of the light transmissivity (%) of the cured coating at a wavelength of 395 nm and the irradiation energy (mJ/cm$^2$) of the ultraviolet radiation is preferably 4.0 or more, more preferably 6.0 or more. The upper limit of the product of the light transmissivity (%) of the cured coating at a wavelength of 395 nm and the irradiation energy (mJ/cm$^2$) of the ultraviolet radiation is not limited, and it is preferably 10.0 or less. Ensuring the upper limit is 10.0 or less often makes the recording method more balanced because doing so avoids excessive compromise on color development and increased cost of the printer due to additional radiation emitters. In general, the use of a thioxanthone-based photopolymerization initiator tends to reduce adhesiveness, although improving surface tackiness. This tendency is significant when the OD of the cured coating is 1.8 or more. However, making the aforementioned product 2 or more ensures that the ultraviolet radiation reaches the inside of the ink composition and the cured coating is obtained with enhanced adhesiveness, despite the OD of the cured coating of 1.8 or more and the presence of a thioxanthone-based photopolymerization initiator. As a result, the reduction of surface tackiness and the improvement of adhesiveness are achieved at the same time.

The irradiation energy of the ultraviolet radiation is preferably from 350 to 1000 mJ/cm$^2$, more preferably from 380 to 750 mJ/cm$^2$, even more preferably 400 to 600 mJ/cm$^2$. Ensuring that this irradiation energy is 350 mJ/cm$^2$ or more often enhances curability. Ensuring that this irradiation energy is 1000 mJ/cm$^2$ or less often makes the radiation emitter cost and the size of the radiation emitter more reasonable.

The light transmissivity (transmissivity) of the cured coating made from an ink composition according to this embodiment at a wavelength of 395 nm is preferably 0.001% or more, preferably 0.002% or more, more preferably 0.003% or more, even more preferably 0.004% or more. Making this light transmissivity 0.001% or more ensures internal curability and thereby often enhances adhesiveness. This light transmissivity is preferably 0.018% or less, more preferably 0.015% or less, even more preferably 0.010% or less, in particular 0.008% or less, in more particular 0.005% or less. Making this light transmissivity 0.018% or less ensures an appropriate coloring material concentration and thereby often enhances the color development on the printed matter. This light transmissivity can be improved by reducing the coloring material concentration or the concentration of the thioxanthone-based initiator or reducing the amount of the ink composition applied, and can be reduced by increasing the coloring material concentration or the concentration of the thioxanthone-based initiator or increasing the amount of the ink composition applied. This light transmissivity can be measured by the method described in Examples. At the measurement of light transmissivity, the cured coating need to be hard enough for the recording to be used. The transmissivity of the cured coating at a wavelength of 395 nm generally depends on recording conditions such as the amount of the ink composition applied to the substrate (the thickness of the cured coating) and on factors related to the ink composition, mainly the kind and the content of coloring material contained in the ink composition and the thioxanthone-based photopolymerization initiator content, and can be adjusted by changing such parameters. The content of yellow coloring material and black coloring material is a particularly influential factor compared to that of other coloring materials. The light transmissivity of the coloring material and the thioxanthone-based photopolymerization initiator at a wavelength of 395 nm generally remains unchanged while the ink composition is cured.

Among varying light transmissivity values of the cured coating at a wavelength of 395 nm, the light transmissivity of the cured coating at a wavelength of 395 nm measured when the coating has a thickness of 10 µm is preferably 0.0015% or more, more preferably 0.002% or more, even more preferably 0.003%, in particular 0.004% or more. Making this light transmissivity 0.0015% or more ensures internal curability and thereby often enhances adhesiveness. This light transmissivity is preferably 0.015% or less, more preferably 0.010% or less, even more preferably 0.008% or less, in particular 0.005% or less, in more particular 0.004% or less. Making this light transmissivity 0.015% or less ensures an appropriate coloring material concentration in the coating and thereby often enhances the color development on the printed matter. This light transmissivity decreases with increasing coloring material content and improves with decreasing coloring material content. Within the range of 395 nm, Bk (black) and Y (yellow) are particularly influential factors and have an exponential effect. Note that this light transmissivity is that of a 10-µm thick cured coating made from an ink composition that has the same formula as the cured coating formed in this embodiment. This means that the light transmissivity of the cured coating formed in this embodiment itself is not limited to this light transmissivity. This light transmissivity can be measured by the method described in Examples.

The OD of the cured coating is 1.8 or more so that the cured coating should have a strong color, preferably 2.0 or more, more preferably 2.1 or more. Making the OD 1.8 or more means further reducing the ultraviolet transmissivity of the cured coating and would usually cause poor adhesiveness. In an ink jet recording method according to this embodiment, however, the cured coating is obtained with excellent adhesiveness. The upper limit of the OD is not limited, and it can be, for example, 2.5 or less, 2.3 or less, 2.1 or less, or 2.0 or less. This OD is that of a 10-µm thick cured coating and, more specifically, is a value that can be measured by the method described in Examples.

In this embodiment, it is preferred that the irradiation with ultraviolet radiation be carried out more than once. Such multiple shots of irradiation may include irradiation for temporary curing. The term "temporary curing" refers to pinning of an ink composition, or more specifically curing an ink composition before full curing in order to prevent bleeding between dots and control the dot diameter. In general, the degree of polymerization of a polymerizable compound achieved by temporary curing is lower than that of the same polymerizable compound achieved by the subsequent full curing. The term "full curing" refers to curing dots formed on a substrate until a cured state required of the cured coating. Unless otherwise specified, "curing" mentioned herein means this full curing. Preferably, such multiple shots of irradiation with ultraviolet radiation are performed in one pass.

When the irradiation with ultraviolet radiation is done more than once, it is preferred that the irradiation energy of the first shot be lower than that of the second and subsequent shots. More specifically, the irradiation energy of the first shot is preferably from 5 to 50 mJ/cm$^2$, more preferably from 10 to 30 mJ/cm$^2$, even more preferably from 15 to 25 mJ/cm$^2$. Ensuring that the irradiation energy of the first shot is in these ranges often enhances surface curability and further reduces bleeding between dots. The irradiation energy of the second and subsequent shots is preferably from 350 to 1000 mJ/cm$^2$, more preferably from 400 to 600 mJ/cm$^2$. Ensuring that the irradiation energy of the second shot is in these ranges often enhances internal curability. When the irradiation with ultraviolet radiation is done more than once, the aforementioned product is calculated with the total irradiation energy of the multiple shots.

An ink jet recording method according to this embodiment is preferably carried out with a line printer that performs recording by one-pass printing with a line head that has a width equal to or greater than the recording width of the substrate. A serial printer applies dots at adjacent pixels in separate passes and carries out irradiation with ultraviolet radiation in each pass, whereas a line printer applies all dots and irradiates them in a single pass (one-pass printing). In general, a line printer tends to be more likely to cause poor internal curability and poor adhesiveness than a serial printer. An aspect of the invention is therefore particularly advantageous to an ink jet recording method carried out with a line printer.

The thickness of the cured coating is not limited. For a cured coating with a certain thickness that can be formed by the recording process, the irradiation is carried out with an irradiation energy that makes the product of the transmissivity of the cured coating at a wavelength of 395 nm and the irradiation energy 2 or more. Preferably, the thickness of the cured coating is 13 µm or less, more preferably 11 µm or less, even more preferably 10 µm or less. Ensuring that the thickness is 13 µm or less enhances adhesiveness and reduces feeling of coating thickness on the printed matter. The thickness of the cured coating is preferably 1 µm or more, more preferably 1.5 µm or more, even more preferably 2.0 µm or more. Ensuring that the thickness is 1 µm or more makes the cured coating less susceptible to oxygen inhibition and thereby often leads to excellent surface tackiness. The thickness of the cured coating depends on the amount of the ink composition applied to print a solid image and can be controlled by adjusting the ink mass per dot or the ink duty (the ratio of the number of pixels at which dots are formed to a certain number of pixels within a pattern).

Ink Jet Recording Apparatus

The following describes an ink jet recording apparatus (a printer) for carrying out the above-described ink jet recording method with reference to the drawings. Ink jet recording apparatus used in this embodiment is not limited to the one described below.

FIG. 1 is a block diagram that illustrates an example of the structure of an ink jet recording apparatus that can be used in this embodiment. A computer 130, installed with a printer driver, outputs printing data for an image to a printer 1 to make the printer 1 record the image. The printer 1 has a transport unit 20, a head unit 30, an irradiation unit 40, detectors 110, a memory 123, an interface 121, and a controller 120. After receiving the printing data from the computer 130 as an external component, the printer 1 controls the individual units with the controller 120 and records the image on a substrate following the printing data. The status of the inside of the printer 1 is monitored by the detectors 110, and the detectors 110 output the results of detection to the controller 120. The controller 120 controls the individual units in response to the results of detection output from the detectors 110 and stores the printing data input through the interface 120 in the memory 123. The controller 120 has a CPU 122 and a unit-controlling circuit 124. The memory 123 also stores control information, which is used to control the individual units. The controller 120 controls the individual units to carry out the irradiation with an irradiation energy that makes the product of the transmissivity of the cured coating at a wavelength of 395 nm and the irradiation energy 2 or more. For example, the controller 120 controls the individual units to carry out the irradiation with an irradiation energy that makes the product of the transmissivity at a wavelength of 395 nm and the irradiation energy 2 or more for a cured coating with the largest thickness that can be formed by the recording process. This ensures that the product of the transmissivity of the cured coating at a wavelength of 395 nm and the irradiation energy is always 2 or more for all cured coatings with different thickness parameters that can be formed by the recording process. If the largest possible achievable thickness of the cured coating varies depending on the recording mode, including the kind of substrate, recording resolution, and other factors, the controller 120 controls the individual units to carry out the irradiation with different irradiation energy levels so that the product of the transmissivity at a wavelength of 395 nm and the irradiation energy should be 2 or more in each recording mode.

Examples of printers that can be used in this embodiment include a line printer and a serial printer. A line printer is preferred. A serial printer applies dots at adjacent pixels in separate passes and carries out irradiation with ultraviolet radiation in each pass, whereas a line printer applies all dots and irradiates them in a single pass (one-pass printing). In general, a line printer tends to be more likely to cause poor internal curability and poor adhesiveness than a serial printer. An aspect of the invention is therefore particularly advantageous to an ink jet recording method carried out with a line printer.

A line printer, i.e., ink jet recording apparatus based on the line printing technology, has a line head whose length is equal to or greater than the length corresponding to the width of the substrate. An ink composition is discharged from the line head toward the substrate while the line head and the substrate move relative to each other in a scanning direction, which crosses the width direction. In other words, the ink composition is discharged from the line head toward a substrate scanned relative to the line head. A line printer carries out recording in one pass (single-pass) with the head in an (almost) fixed position. A line printer is advantageous over a serial printer in its high recording speed.

The expression "a line head whose length corresponds to the width of the substrate" does not necessarily mean that the width of the substrate and the length (width) of the line head are completely equal; the width of the substrate and the length (width) of the line head may be different. Examples of cases where they may be different include a case in which the length (width) of the line head corresponds to the width of the substrate in which an ink composition should be applied (an image should be recorded) (the recording width).

On the other hand, a serial printer, i.e., ink jet recording apparatus based on the serial printing technology, carries out primary scanning (a pass) in which the head discharges an ink composition while moving in a primary substrate scanning direction that crosses a secondary scanning direction, and a serial printer usually performs recording in two or more passes (multiple-pass).

Ink Jet Head

The head unit 30 of the ink jet recording apparatus (printer 1) has a head (ink jet head) that discharges an ink composition toward a substrate, thereby performing recording. The head has a cavity, a discharge-driving section provided for the cavity, and a nozzle provided for the cavity. The cavity contains the ink composition to be discharged through the nozzle, the discharge-driving section provides the ink composition with driving force for discharge, and the nozzle is an opening through which the ink composition is discharged out of the head. One head may have multiple independent cavities and discharge-driving sections and nozzles for the respective cavities. Examples of elements of which the discharge-driving section can be composed include electromechanical transducers, which change the volume of the cavity through mechanical deformation, such as a piezoelectric element, and electrothermal transducers, which generate heat to form bubbles in the ink composition and thereby let the ink composition out. The ink jet recording apparatus may have one or multiple heads per color of ink. If the ink jet apparatus has multiple heads, the multiple heads may be arranged in the substrate width direction to make up a line head, and this leads to the aforementioned recording width being extended. When multiple colors of ink compositions are used for recording, the ink jet recording apparatus has a head for each ink composition. The structure of such a head can be, for example, as in FIG. 3 of JP-A-2009-279830.

Figure 2:
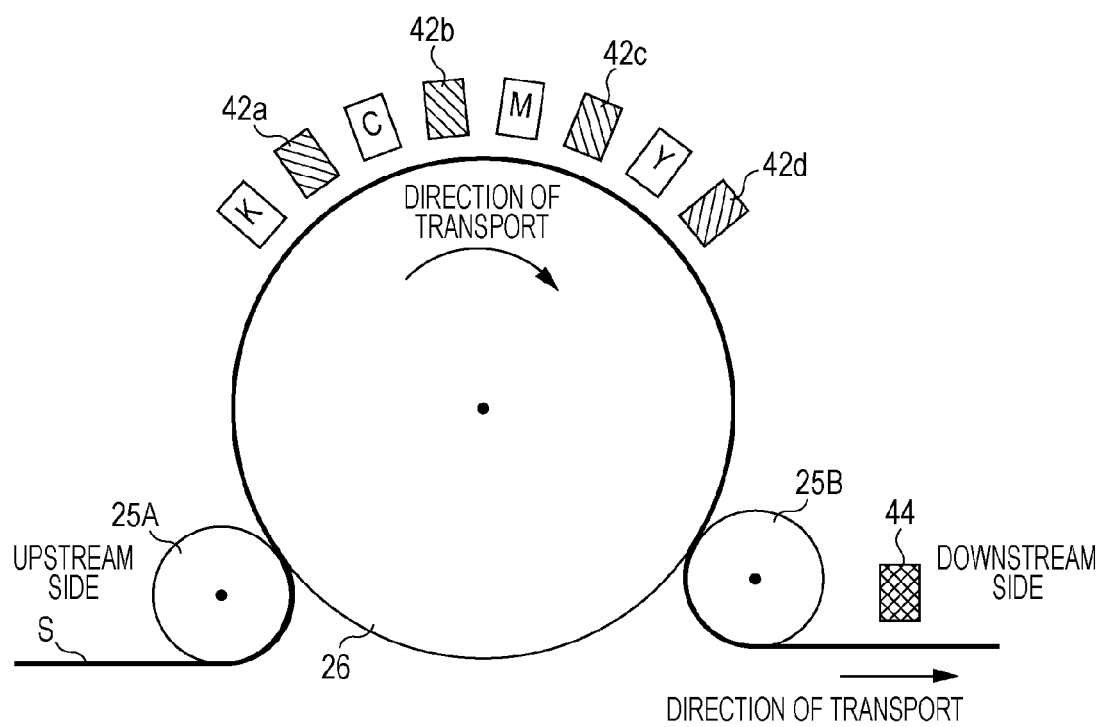
FIG. 2 is a schematic cross-sectional diagram that illustrates an example of the surroundings of the head unit, the transport unit, and the irradiation unit of a line printer that is an example of an ink jet recording apparatus that can be used in this embodiment.

The following describes a line printer, an example of an ink jet recording apparatus that can be used in this embodiment, in detail with reference to FIG. 2. FIG. 2, used in the following description, illustrates the individual components in different scales as necessary to make the components recognizable.

Line Printer

FIG. 2 is a schematic cross-sectional diagram that illustrates an example of the surroundings of the head unit, the transport unit, and the irradiation unit of this line printer, an example of a printer that can be used in this embodiment.

A transport motor (not illustrated) rotates transport rollers including an upstream roller 25A and a downstream roller 25B and a transport drum 26 rotates following the rollers. A substrate S is transported along the peripheral surface of the transport rollers 25A and 25B and the transport drum 26 as a support while the transport rollers rotate. Around the transport drum 26 line heads including a head K, a head C, a head M, and a head Y are arranged facing the transport drum 26.

The transport drum 26 has a surface on which the substrate S is transported, and supports the substrate S with this surface, and moves relative to the heads. When the transport drum 26 moves relative to the heads while supporting the substrate S, the period of time needed for the transport drum 26 starting from a given position to return to the same position (cycle) is preferably 5 seconds or more, more preferably 6 seconds or more. Ensuring that this period of time is in these ranges often allows for sufficient time for the support to dissipate heat and thereby reduces temperature elevation. The upper limit of this cycle is not limited, and it is preferably 15 seconds or less, for example, for high-speed printing.

This movement on the support in a certain cycle is carried out at least while ink jet recording is performed. More specifically, this movement on the support in a certain cycle is carried out continuously or intermittently while ink jet recording is performed.

The shape of the support is not limited to a drum-shaped support like that illustrated in FIG. 2. Examples of the shape of the support include, but are not limited to, a roller-shaped or a belt-shaped support and a support that has the shape of a plate that supports the substrate S (e.g., a platen). The movement of the support relative to the heads may be one in which the support moves (rotates) from a given position and returns to the same position in one direction or one in which the support starting from a given position returns to the same position after a combination of movement in a first direction and movement in a second direction. In the latter case, an example is a form of movement in which the movement in the first direction is one associated with recording on a first sheet-shaped substrate and the movement in the second direction is one for recording on the next substrate after the completion of the recording on the first substrate.

For a serial printer, the movement in the first direction corresponds to secondary scanning. The movement of the support relative to the heads can be any form of movement in which the relative position of the support to the heads changes, and therefore includes a movement in which the heads move with respect to the support.

Examples of materials for the support include, but are not limited to, metal, resin, and rubber. In particular, metal is preferred. When the material is metal, the support can be used for long periods of time unlike one made of rubber or any other polymer material because no cracks that would be likely due to heat-induced deterioration occur even after long-term use. Examples of metals that can be used include, but are not limited to, aluminum, stainless steel, copper, and iron and alloys of such metals. If the support is made of metal, the surface of the support, i.e., the surface on which the substrate S is transported, may be coated with a coating agent or a similar material. This makes the hardness of the surface of the support improved compared to that of the surface of an uncoated support and also makes the surface of the support less slippery for the substrate. Examples of such coating agents include, but are not limited to, organic coating agents such as resins and inorganic coating agents such as inorganic compounds and composite coating agents containing such types of coatings. These matters concerning the support is not only applied to a line printer but can also be applied to a serial printer.

In this way, recording is preformed through a discharge operation in which the ink composition is discharged and applied to the substrate S that faces the line heads. Irradiation sections for temporary curing 42a, 42b, 42c, and 42d are located downstream of the line heads in the direction of transport and emit ultraviolet radiation toward the substrate S. An irradiation section for full curing 44 is located further downstream in the direction of transport. The structure of such recording apparatus can be, for example, as in FIG. 11 of JP-A-2010-269471.

The irradiation section for full curing 44 emits ultraviolet radiation until the ink composition is fully cured. It is therefore possible to finish the curing operation with irradiation with ultraviolet radiation from the irradiation section for full curing 44, omitting the irradiation with ultraviolet radiation from some or all of the irradiation sections for temporary curing 42a, 42b, 42c, and 42d. The curing operation may thus be one in which temporary curing is omitted and only full curing is performed.

In this way, this embodiment provides ink jet recording apparatus that is excellent in terms of all of curability, discharge stability, and the reduction of temperature elevation in the recording apparatus after continuous printing and reduces the occurrence of creases associated with curing. Furthermore, recording apparatus according to this embodiment provides excellent curability and discharge stability and is excellent in terms of the reduction of temperature elevation in the recording apparatus after continuous printing even when used with an ink composition with a low viscosity.

EXAMPLES

The following describes an aspect of the invention in more detail by providing examples and comparative examples. No aspect of the invention is limited to these examples.

Materials for Ink Compositions

The following is a list of some important materials used to prepare the ink compositions used in Examples, Comparative Examples, and Reference Examples below.

Polymerizable compounds
  VEEA (2-(2-vinyloxyethoxy)ethyl acrylate, Nippon Shokubai Co., Ltd.)
  PEA (phenoxyethyl acrylate, OSAKA ORGANIC CHEMICAL INDUSTRY LTD.)
  DPGDA (dipropylene glycol diacrylate, Sartomer)
  A-DPH (dipentaerythritol hexaacrylate, Shin-Nakamura Chemical)
Thioxanthone-Based Photopolymerization Initiator
  Speedcure DETX (a trade name of a Lambson product, 100% solids)
Other Photopolymerizable Compounds
  IRGACURE 819 (a trade name of a BASF product, 100% solids)
  DAROCURE TPO (a trade name of a BASF product, 100% solids)
Surfactant
  BYK UV3500
Dispersant
  Solsperse 36000 (a trade name of a LUBRIZOL product; hereinafter abbreviated to Sol36000)
Coloring Materials
  C.I. Pigment Blue 15:3
  C.I. Pigment Yellow 155
  Carbon black
Preparation of the Ink Compositions
  Ink compositions were prepared in the air by mixing materials in the proportions (parts by mass) specified in Table 1 and thoroughly stirring the mixture.

TABLE 1

| Ink composition | | 1 | 2 | 3 | 4 | 5 | 6 | 7 |
| --- | --- | --- | --- | --- | --- | --- | --- | --- |
| Polymerizable compounds | VEEA | 20.0 | 20.0 | 20.0 | 20.0 | 20.0 | 20.0 | 20.0 |
| | PEA | 40.0 | 40.0 | 40.0 | 40.0 | 40.0 | 40.0 | 40.0 |
| | DPGDA | 17.6 | 24.1 | 18.1 | 23.4 | 17.6 | 17.1 | 18.4 |
| | A-DPH | 8.0 | — | 8.0 | — | 8.0 | 8.0 | 8.0 |
| Thioxanthone-based photopolymerization initiator | Speedcure DETX | 2.5 | 3.8 | 2.5 | 4.5 | 3.0 | 3.5 | 2.5 |
| Other polymerization initiators | Irgacure 819 | 3.0 | 3.0 | 3.0 | 3.0 | 3.0 | 3.0 | 3.0 |
| | Darocur TPO | 5.0 | 5.0 | 5.0 | 5.0 | 5.0 | 5.0 | 5.0 |
| Leveling agents | BYK UV3500 | 0.5 | 0.5 | 0.5 | 0.5 | 0.5 | 0.5 | 0.5 |
| | BYK 350 | — | — | — | — | — | — | — |

TABLE 1-continued

| | | | | | | | | |
|---|---|---|---|---|---|---|---|---|
| Dispersant | Sol 36000 | 1.0 | 1.0 | 1.0 | 1.0 | 1.0 | 1.0 | 1.0 |
| Coloring materials | C.I. Pigment Blue 15:3 | 2.4 | — | — | — | — | — | — |
| | C.I. Pigment Yellow 155 | — | 2.6 | — | 2.6 | — | — | — |
| | Carbon black | — | — | 1.9 | — | 1.9 | 1.9 | 1.6 |
| Light transmissivity at 395 nm for a thickness of 10 μm | | 0.060 | 0.005 | 0.005 | 0.004 | 0.004 | 0.003 | 0.015 |
| OD of a solid pattern | | 2.3 | 1.8 | 2.0 | 1.8 | 2.0 | 2.0 | 1.8 |

| Ink composition | | 8 | 9 | 10 | 11 | 12 | 13 | 14 |
|---|---|---|---|---|---|---|---|---|
| Polymerizable compounds | VEEA | 20.0 | 20.0 | 20.0 | 20.0 | 20.0 | 20.0 | 20.0 |
| | PEA | 40.0 | 40.0 | 40.0 | 40.0 | 40.0 | 40.0 | 40.0 |
| | DPGDA | 24.1 | 22.4 | 24.6 | 24.7 | 24.1 | 24.1 | 25.9 |
| | A-DPH | — | — | — | — | — | — | — |
| Thioxanthone-based photopolymerization initiator | Speedcure DETX | 1.5 | 5.5 | 3.8 | 3.8 | 3.8 | 4.5 | — |
| Other polymerization initiators | Irgacure 819 | 5.3 | 3.0 | 3.0 | 3.0 | 3.0 | — | 5.0 |
| | Darocur TPO | 5.0 | 5.0 | 5.0 | 5.0 | 5.0 | — | 5.0 |
| Leveling agents | BYK UV3500 | 0.5 | 0.5 | 0.2 | 0.5 | — | 0.5 | 0.5 |
| | BYK 350 | — | — | — | — | 0.5 | — | — |
| Dispersant | Sol 36000 | 1.0 | 1.0 | 1.0 | 1.0 | 1.0 | 1.0 | 1.0 |
| Coloring materials | C.I. Pigment Blue 15:3 | — | — | — | — | — | — | — |
| | C.I. Pigment Yellow 155 | 2.6 | 2.6 | 2.6 | 2.0 | 2.6 | 2.6 | 2.6 |
| | Carbon black | — | — | — | — | — | — | — |
| Light transmissivity at 395 nm for a thickness of 10 μm | | 0.010 | 0.002 | 0.005 | 0.020 | 0.005 | 0.004 | 0.020 |
| OD of a solid pattern | | 1.8 | 1.8 | 1.8 | 1.0 | 1.8 | 1.8 | 1.8 |

Measurement method: ink compositions 1 to 11
Light transmissivity at a wavelength of 395 nm for a thickness of 10 μm A line printer was prepared. As this line printer, SurePress L-4033A (Seiko Epson Corporation) was used after the following modifications. As illustrated in FIG. 2, four line heads (heads whose length almost corresponded to the width of the substrate in which an image should be recorded (recording width)) were arranged in the direction of substrate transport, and a light source was provided downstream of each head in the direction of transport. During recording with the line printer the head K, the irradiation section 42a for temporary curing, and the irradiation section 44 for full curing were used out of the heads and light sources illustrated in FIG. 2, and the other heads and light sources were not used. The transport drum 26 was made of aluminum, the diameter of the transport drum 26 was 500 mm, the printing speed was 285 mm/sec, and the drum rotation cycle was 5.5 seconds. The head had a nozzle pitch of 600 dpi in the substrate width direction in a nozzle row.

An ink composition in Table 1 was discharged from the head K toward PET film (TORAY LUMIRROR S10 (thickness: 100 μm)) in one pass (single-pass) with a recording resolution of 600 dpi×600 dpi. The amount of ink droplets per pixel was adjusted in such a manner that the thickness after curing should be 10 μm. In this way, a solid pattern image was formed. The term "solid pattern image" means that a dot is recorded at all pixels, which are the smallest unit areas of recording defined by the recording resolution, and all background on the substrate in the pattern is covered with ink.

Then the ink composition was cured by irradiating the ink composition applied to the PET film with ultraviolet radiation from the light source. More details were as follows. The light source 42a was an LED that had a peak wavelength of 395 nm and an irradiation peak intensity of 500 mW/cm². This LED was used to irradiate the solid pattern image with ultraviolet radiation at an irradiation energy of 20 mJ/cm² for temporary curing. The light source 44 was an LED that had a peak wavelength of 395 nm and an irradiation peak intensity of 1,500 mW/cm². This LED was used to irradiate the solid pattern image with ultraviolet radiation at an irradiation energy of 400 mJ/cm² for a predetermined time until the image was cured. In this way, a 10-μm thick coating cured from the solid pattern image was obtained. A finger-touch test confirmed that the tackiness of the surface of the cured coating had been lost. The light transmissivity of this cured coating at 395 nm was measured with U3300 spectrophotometer (Shimadzu Corporation).

OD of a Solid Pattern

The OD of the cured coating used to measure the internal transmissivity was measured with Spectrolino (Gretag).

Evaluation method: Examples 1 to 14, Comparative Examples 1 to 5, and Reference Examples 1 to 5

Adhesiveness

With the same line printer as that used in the method for measuring light transmissivity described above, the prepared ink composition was discharged toward PET film (LUMIRROR 125E20 [trade name], TORAY) in an amount of ink droplets that would make the thickness 10 μm (cured coating), and the ink composition applied to the substrate was irradiated with ultraviolet radiation at a predetermined irradiation energy (irradiation Eng) to form a 10-μm thick solid-pattern cured coating. The adhesiveness of the cured coating was evaluated in accordance with JIS K-5600-5-6 (ISO 2409) (Testing methods for paints—Part 5: Mechanical property of film—Section 6: Adhesion test (Cross-cut test)). The irradiation energy parameters of ultraviolet radiation (irradiation energy levels from the irradiation section for full curing 44 and the irradiation section for temporary curing 42a and the total of the two energy levels) are summarized in Table 2. The unit of irradiation energy in the table, mJ, represents mJ/cm².

In Example 10, the head was replaced with one that had a nozzle pitch of 400 dpi in the substrate width direction in a nozzle row, the recording density was 400 dpi×400 dpi, the ink composition was discharged with the amount of ink droplets per dot increased from that in Example 1 so that the thickness should be 10 μm (cured coating), and the ink composition applied to the substrate was irradiated with ultraviolet radiation to form a 10-μm thick solid-pattern cured coating.

In Reference Examples 3 and 4, a serial printer was used instead of the line printer. As the serial printer, EPSON SC-530650, a trade name, was used after some modifications. Specifically, light sources of the same type as those used in the line printer were provided next to a head on a carriage on both sides in the primary scanning direction, the length of the light sources equal to that of the head in the secondary scanning direction, so that the ink composition applied to the substrate could be irradiated during primary scanning. The head has a nozzle pitch of 300 dpi. The conditions of recording with the serial printer were performed with a recording resolution per pass of 300×300 dpi and included carrying out secondary scanning over a distance half the length of the head in the secondary scanning direction between passes and completing recording on the substrate facing the head in two passes so that the final recording resolution should be 600×600 dpi. During primary scanning with the head, only the light source located downstream in the primary scanning direction was on for irradiation, while the light source located upstream was off. The irradiation energy per pass was 100 mJ/pass. In the same area of the substrate, the ink composition applied in the first pass was also irradiated during the second pass. The total irradiation energy is therefore 200 mJ/cm$^2$ for this ink composition. For the ink composition applied in the second pass, the total irradiation energy is 100 mJ/cm$^2$. This means that there were two irradiation energy×transmissivity values.

For the evaluation of adhesiveness, a single-blade cutting tool (a commercially available utility knife) as a cutting tool and a guide with which equally spaced cuts could be made with the single-blade cutting tool were first prepared. Six cuts were first made in the obtained cured coating (cut-to-cut distance: 1 mm; the same applies hereinafter) with the blade of the cutting tool held perpendicular to the cured coating. After these six cuts were made, the cured coating was turned 90°, and another six cuts were made perpendicular to the existing cuts. Then an about 75-mm long piece of transparent adhesive tape (width: 25±1 mm) was attached to the area of the cured coating cut in a grid pattern, and the tape was thoroughly rubbed with a finger so that the cured coating should be seen therethrough. Then within 5 minutes after the tape was attached, the tape was removed carefully from the cured coating in 0.5 to 1.0 second at an angle of near 60°, and the condition of the cured coating was visually inspected. The evaluation criteria were as follows. The results are summarized in Table 2.

○: Detachment of the cured coating was observed in less than 5% of the grid.

Δ: Detachment of the cured coating was observed in 5% or more and less than 35% of the grid.

X: Detachment of the cured coating was observed in 35% or more of the grid.

Surface Tackiness

A cured coating was prepared in the same way as in the evaluation of adhesiveness except that the ink composition was discharged in an amount of ink droplets that would make the thickness of the cured coating 1 μm and the ink composition applied to the substrate was irradiated with ultraviolet radiation to form a 1-μm thick solid-pattern cured coating. The surface of the cured coating was rubbed with a Johnson's cotton swab, available from Johnson & Johnson. The number of times of rubbing was five reciprocating strokes, and the force of rubbing was a load of 3 g. The rubbed surface of the cured coating was visually inspected. Evaluation with a thin film allows for an evaluation under conditions under which the surface of the coating is unlikely to be cured by oxygen inhibition. The evaluation criteria were as follows. The results are summarized in Table 2.

○: No streaks were seen on the cured coating, and no ink composition adhered to the cotton swab.

Δ: No streaks were seen on the cured coating, but adhesion of the ink composition was observed on the cotton swab.

X: A streak was seen on the cured coating.

Bleeding Test

The edge portion of the cured coating prepared for the evaluation of adhesiveness was visually inspected. The evaluation criteria were as follows. The results are summarized in Table 2.

○: The edge portion was clear-cut.

Δ: The edge portion was ambiguous.

X: Bleeding was observed in the edge portion.

TABLE 2

|  | Examples | | | | | | | | | |
|---|---|---|---|---|---|---|---|---|---|---|
|  | 1 | 2 | 3 | 4 | 5 | 6 | 7 | 8 | 9 | 10 |
| Ink composition | 2 | 3 | 4 | 5 | 6 | 7 | 8 | 9 | 10 | 2 |
| Recording resolution (dpi × dpi) | 600 × 600 | 600 × 600 | 600 × 600 | 600 × 600 | 600 × 600 | 600 × 600 | 600 × 600 | 600 × 600 | 600 × 600 | 400 × 400 |
| Printer | Line | Line | Line | Line | Line | Line | Line | Line | Line | Line |
| Irradiation section for full curing 44 | 380 mJ | 380 mJ | 480 mJ | 480 mJ | 680 mJ | 380 mJ | 380 mJ | 980 mJ | 380 mJ | 380 mJ |
| Irradiation section for temporary curing 42a | 20 mJ | 20 mJ | 20 mJ | 20 mJ | 20 mJ | 20 mJ | 20 mJ | 20 mJ | 20 mJ | 20 mJ |
| Irradiation Eng (total) | 400 mJ | 400 mJ | 500 mJ | 500 mJ | 700 mJ | 400 mJ | 400 mJ | 1000 mJ | 400 mJ | 400 mJ |
| Irradiation Eng × transmissivity | 2.0 | 2.0 | 2.0 | 2.0 | 2.1 | 6.0 | 4.0 | 2.0 | 2.0 | 2.0 |
| Adhesiveness | ○ | ○ | ○ | ○ | ○ | ○ | ○ | Δ | Δ | Δ |
| Surface tackiness | ○ | ○ | ○ | ○ | ○ | ○ | Δ | ○ | ○ | ○ |
| Bleeding test | ○ | ○ | ○ | ○ | ○ | ○ | Δ | ○ | ○ | ○ |

|  | Examples | | | | Comparative Examples | | | | | Reference Examples |
|---|---|---|---|---|---|---|---|---|---|---|
|  | 11 | 12 | 13 | 14 | 1 | 2 | 3 | 4 | 5 | 1 |
| Ink composition | 2 | 8 | 12 | 13 | 2 | 4 | 5 | 6 | 14 | 1 |
| Recording resolution (dpi × dpi) | 600 × 600 | 600 × 600 | 600 × 600 | 600 × 600 | 600 × 600 | 600 × 600 | 600 × 600 | 600 × 600 | 600 × 600 | 600 × 600 |

TABLE 2-continued

| Printer | Line | Line | Line | Line | Line | Line | Line | Line | Line | Line |
|---|---|---|---|---|---|---|---|---|---|---|
| Irradiation section for full curing 44 | 0 mJ | 0 mJ | 380 mJ | 480 mJ | 280 mJ | 280 mJ | 380 mJ | 380 mJ | 0 mJ | 380 mJ |
| Irradiation section for temporary curing 42a | 400 mJ | 400 mJ | 20 mJ | 20 mJ | 20 mJ | 20 mJ | 20 mJ | 20 mJ | 400 mJ | 20 mJ |
| Irradiation Eng (total) | 400 mJ | 400 mJ | 400 mJ | 500 mJ | 300 mJ | 300 mJ | 400 mJ | 400 mJ | 400 mJ | 400 mJ |
| Irradiation Eng × transmissivity | 2.0 | 4.0 | 2.0 | 2.0 | 1.5 | 1.2 | 1.6 | 1.2 | 8.0 | 24.0 |
| Adhesiveness | ○ | ○ | Δ | Δ | X | X | X | X | ○ | ○ |
| Surface tackiness | ○ | Δ | ○ | ○ | X | ○ | X | ○ | X | ○ |
| Bleeding test | ○ | ○ | ○ | ○ | ○ | ○ | ○ | ○ | X | ○ |

| | Reference Examples | | | |
|---|---|---|---|---|
| | 2 | 3 | 4 | 5 |
| Ink composition | 11 | 2 | 5 | 1 |
| Recording resolution (dpi × dpi) | 600 × 600 | 600 × 600 | 600 × 600 | 600 × 600 |
| Printer | Line | Serial, 2-pass | Serial, 2-pass | Line |
| Irradiation section for full curing 44 | 80 mJ | 100 mJ/pass | 100 mJ/pass | 100 mJ |
| Irradiation section for temporary curing 42a | 20 mJ | | | 10 mJ |
| Irradiation Eng (total) | 100 mJ | 100 mJ (200 mJ) | 100 mJ (200 mJ) | 110 mJ |
| Irradiation Eng × transmissivity | 2.0 | 0.5 (1.0) | 0.4 (0.8) | 6.6 |
| Adhesiveness | ○ | ○ | ○ | ○ |
| Surface tackiness | ○ | X | X | ○ |
| Bleeding test | ○ | ○ | ○ | ○ |

Comparison of Example 7 with the other Examples indicated that ensuring the thioxanthone-based photopolymerization initiator content 2% by mass or more improves surface tackiness. Likewise, comparison of Example 8 and the other Examples indicated that ensuring the thioxanthone-based photopolymerization initiator content 5% by mass or less leads to excellent adhesiveness with low irradiation energy.

Comparison of Examples 9 and 13 with the other Examples indicated that the gloss of the surface of the obtained cured coating was generally high in the examples other than Examples 9 and 13, i.e., the examples in which the ink composition contained at least 0.3% by mass silicone surfactant. Thus it was estimated that the surface of the cured coating was smoother in these examples as a result of the ink composition applied to the substrate spreading well. Adhesiveness was also generally better in these examples than in the other two. Thus it was estimated that adhesiveness is generally enhanced when the ink composition applied to the substrate spreads well.

Comparison of Example 10 with the other Examples indicated that the gloss of the surface of the obtained cured coating was generally high in the examples other than Example 10, i.e., the examples in which the recording density was 600 dpi×600 dpi or more. Thus it was estimated that the surface of the cured coating was smoother in these examples. Adhesiveness was also generally better in these examples. Thus it was estimated that adhesiveness is generally enhanced when the recording density is high.

Comparison of Example 14 and the other Examples revealed that adhesiveness is enhanced when the ink composition contains an acylphosphine-oxide-based photopolymerization initiator.

Comparison between Examples 12 and 7 and between Examples 2 and 11 revealed that completing full curing at the irradiation section for temporary curing 42a skipping temporary curing improves bleeding compared to temporary curing followed by full curing at the irradiation section 44 for full curing. However, irradiation with great irradiation energy at the irradiation section for temporary curing 42a caused the head to be readily exposed to light leaking out of the light source and temperature elevation in the nozzle plate. The former can cause the nozzle plate to be stained as a result of the ink composition curing on the nozzle plate, and the latter can cause instable discharge. From this it was found that an aspect of the invention is particularly advantageous when temporary curing is performed and full curing follows because this way of curing is better than the other in terms of the above points.

Comparison of Reference Example 1, Reference Example 5, and the Examples revealed that an ink composition that contains a cyan coloring material with a high transmissivity, even if containing a thioxanthone-based photopolymerization initiator, allows irradiation energy to reach the inside thereof and is not inferior in adhesiveness, and such an ink composition is not inferior in adhesiveness even when the irradiation energy is relatively small. This trend also held in the Examples in which a magenta coloring material was used.

Comparison of Reference Example 2 with the Examples revealed that a cured coating whose OD is low has good adhesiveness and good surface tackiness even with low irradiation energy, but provides only a recording (cured coating) of a weak color because of the low OD.

Comparison of the Examples with Comparative Example 5 revealed that surface tackiness and bleeding resistance are excellent when the ink composition contains a thioxanthone-based photopolymerization initiator.

Comparison of Reference Examples 3 and 4 with Comparative Examples 1 and 3 indicated that the use of a serial printer leads to good adhesiveness even when the irradiation energy×transmissivity is relatively low, but surface tackiness is still poor with this type of printer. This is presumably because the irradiation was carried out in each single pass, or in other words the ink composition was irradiated before all ink composition needed for recording was applied (with only a small amount of ink applied), curing the entire ink composition including the inside and improving adhesiveness. However, the recording speed was generally slow because of two-pass recording. From this it was found that an aspect of the invention is particularly advantageous when a line printer, which applies and irradiates all ink needed for recording in one pass.

The entire disclosure of Japanese Patent Application No.: 2013-120505, filed Jun. 7, 2013 is expressly incorporated by reference herein.

What is claimed is:

1. An ultraviolet-curable ink composition for ink jet for use in an ink jet recording method including irradiating the ultraviolet-curable ink composition for ink jet applied to a substrate with ultraviolet radiation having a peak wavelength in a range of 380 to 405 nm from a semiconductor light source to obtain a cured coating, a product of light transmissivity (%) of the cured coating at a wavelength of 395 nm and irradiation energy of the ultraviolet radiation (mJ/cm$^2$) being 2.0 or more, the ink composition comprising: a thioxanthone-based photopolymerization initiator and at least one of yellow coloring material and black coloring material, an OD of the cured coating made from the ink composition being 1.8 or more.

2. The ultraviolet-curable ink composition for ink jet according to claim 1, wherein the ink jet recording method is one in which recording is carried out by one-pass printing with use of a line printer that has a line head that has a width equal to or greater than a recording width of the substrate.

3. The ultraviolet-curable ink composition for ink jet according to claim 1, wherein the irradiation energy of the ultraviolet radiation is from 350 to 1000 mJ/cm$^2$.

4. The ultraviolet-curable ink composition for ink jet according to claim 1, wherein the substrate is a non-ink-absorbent substrate.

5. The ultraviolet-curable ink composition for ink jet according to claim 1, wherein the ink composition contains 2.0% to 5.0% by mass the thioxanthone-based photopolymerization initiator.

6. The ultraviolet-curable ink composition for ink jet according to claim 1, further comprising 0.30% by mass or more silicone surfactant.

7. The ultraviolet-curable ink composition for ink jet according to claim 1, further comprising 5.0% to 15% by mass acylphosphine-oxide-based photopolymerization initiator.

8. The ultraviolet-curable ink composition for ink jet according to claim 1, wherein the ink jet recording method is one in which recording is carried out with a recording resolution of 600 dpi or more×600 dpi or more.

9. The ultraviolet-curable ink composition for ink jet according to claim 1, wherein the ink composition contains 2.5% to 2.9% by mass the yellow coloring material or 1.5% to 1.9% by mass the black coloring material.

10. The ultraviolet-curable ink composition for ink jet according to claim 1, wherein the ink jet recording method is one in which irradiation with the ultraviolet radiation is carried out more than once.

11. The ultraviolet-curable ink composition for ink jet according to claim 1, wherein a thickness of the cured coating is 13.mu.m or less.

12. The ultraviolet-curable ink composition for ink jet according to claim 1, wherein the cured coating has a light transmissivity of 0.0030% or more at a wavelength of 395 nm when having a thickness of 10 μm.

13. An ink jet recording method comprising: discharging and applying the ultraviolet-curable ink composition for ink jet according to claim 1 to a substrate; and irradiating the ultraviolet-curable ink composition for ink jet applied to the substrate with ultraviolet radiation from a semiconductor light source having a peak wavelength in a range of 380 to 405 nm to obtain a cured coating having an OD of 1.8 or more, a product of light transmissivity (%) of the cured coating made from the ultraviolet-curable ink composition for ink jet at a wavelength of 395 nm and irradiation energy of the ultraviolet radiation (mJ/cm$^2$) being 2 or more.

14. An ink jet recording method comprising: discharging and applying the ultraviolet-curable ink composition for ink jet according to claim 2 to a substrate; and irradiating the ultraviolet-curable ink composition for ink jet applied to the substrate with ultraviolet radiation from a semiconductor light source having a peak wavelength in a range of 380 to 405 nm to obtain a cured coating having an OD of 1.8 or more, a product of light transmissivity (%) of the cured coating made from the ultraviolet-curable ink composition for ink jet at a wavelength of 395 nm and irradiation energy of the ultraviolet radiation (mJ/cm$^2$) being 2 or more.

15. An ink jet recording method comprising: discharging and applying the ultraviolet-curable ink composition for ink jet according to claim 3 to a substrate; and irradiating the ultraviolet-curable ink composition for ink jet applied to the substrate with ultraviolet radiation from a semiconductor light source having a peak wavelength in a range of 380 to 405 nm to obtain a cured coating having an OD of 1.8 or more, a product of light transmissivity (%) of the cured coating made from the ultraviolet-curable ink composition for ink jet at a wavelength of 395 nm and irradiation energy of the ultraviolet radiation (mJ/cm$^2$) being 2 or more.

16. An ink jet recording method comprising: discharging and applying the ultraviolet-curable ink composition for ink jet according to claim 4 to a substrate; and irradiating the ultraviolet-curable ink composition for ink jet applied to the substrate with ultraviolet radiation from a semiconductor light source having a peak wavelength in a range of 380 to 405 nm to obtain a cured coating having an OD of 1.8 or more, a product of light transmissivity (%) of the cured coating made from the ultraviolet-curable ink composition for ink jet at a wavelength of 395 nm and irradiation energy of the ultraviolet radiation (mJ/cm.sup.2) being 2 or more.

17. An ink jet recording method comprising: discharging and applying the ultraviolet-curable ink composition for ink jet according to claim 5 to a substrate; and irradiating the ultraviolet-curable ink composition for ink jet applied to the substrate with ultraviolet radiation from a semiconductor light source having a peak wavelength in a range of 380 to 405 nm to obtain a cured coating having an OD of 1.8 or more, a product of light transmissivity (%) of the cured coating made from the ultraviolet-curable ink composition for ink jet at a wavelength of 395 nm and irradiation energy of the ultraviolet radiation (mJ/cm$^2$) being 2 or more.

18. An ink jet recording method comprising: discharging and applying the ultraviolet-curable ink composition for ink jet according to claim 6 to a substrate; and irradiating the ultraviolet-curable ink composition for ink jet applied to the substrate with ultraviolet radiation from a semiconductor light source having a peak wavelength in a range of 380 to 405 nm to obtain a cured coating having an OD of 1.8 or more, a product of light transmissivity (%) of the cured coating made from the ultraviolet-curable ink composition for ink jet at a wavelength of 395 nm and irradiation energy of the ultraviolet radiation (mJ/cm$^2$) being 2 or more.

19. An ink jet recording method comprising: discharging and applying the ultraviolet-curable ink composition for ink jet according to claim 7 to a substrate; and irradiating the ultraviolet-curable ink composition for ink jet applied to the substrate with ultraviolet radiation from a semiconductor light source having a peak wavelength in a range of 380 to 405 nm to obtain a cured coating having an OD of 1.8 or more, a product of light transmissivity (%) of the cured coating made from the ultraviolet-curable ink composition for ink jet at a wavelength of 395 nm and irradiation energy of the ultraviolet radiation (mJ/cm$^2$) being 2 or more.

20. An ink jet recording method comprising: discharging and applying the ultraviolet-curable ink composition for ink jet according to claim 8 to a substrate; and irradiating the ultraviolet-curable ink composition for ink jet applied to the substrate with ultraviolet radiation from a semiconductor light source having a peak wavelength in a range of 380 to 405 nm to obtain a cured coating having an OD of 1.8 or more, a product of light transmissivity (%) of the cured coating made from the ultraviolet-curable ink composition for ink jet at a wavelength of 395 nm and irradiation energy of the ultraviolet radiation (mJ/cm$^2$) being 2 or more.

* * * * *